(12) United States Patent
Palanivelu et al.

(10) Patent No.: US 9,100,975 B2
(45) Date of Patent: Aug. 4, 2015

(54) METHODS AND APPARATUS FOR TRANSMITTING CLEAR TO SEND (CTS)-TO-SELF INDICATION

(71) Applicant: QUALCOMM Incorporated, San Diego, CA (US)

(72) Inventors: Arul Durai Murugan Palanivelu, Bangalore (IN); Kapil Bhattad, Bangalore (IN); Dhananjay Ashok Gore, Bangalore (IN); Ashok Mantravadi, San Diego, CA (US); Ahmed Kamel Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 13/957,241

(22) Filed: Aug. 1, 2013

(65) Prior Publication Data

US 2014/0038625 A1 Feb. 6, 2014

Related U.S. Application Data

(60) Provisional application No. 61/679,414, filed on Aug. 3, 2012.

(51) Int. Cl.
*H04W 72/00* (2009.01)
*H04W 72/12* (2009.01)
*H04W 52/02* (2009.01)
*H04W 88/10* (2009.01)

(52) U.S. Cl.
CPC .......... *H04W 72/12* (2013.01); *H04W 52/0235* (2013.01); *H04W 72/1215* (2013.01); *H04W 88/10* (2013.01)

(58) Field of Classification Search
USPC ....................................... 455/127.5, 574, 450
See application file for complete search history.

(56) References Cited

U.S. PATENT DOCUMENTS

| | | |
|---|---|---|
| 2007/0058605 A1 | 3/2007 | Meylan et al. |
| 2009/0137206 A1 | 5/2009 | Sherman et al. |
| 2009/0196210 A1 | 8/2009 | Desai |

(Continued)

FOREIGN PATENT DOCUMENTS

| | | |
|---|---|---|
| EP | 1681772 A1 | 7/2006 |
| EP | 2063548 A1 | 5/2009 |
| WO | WO-2011123531 A1 | 10/2011 |

OTHER PUBLICATIONS

International Search Report and Written Opinion—PCT/US2013/053384—ISA/EPO—Oct. 12, 2013.

*Primary Examiner* — Joel Ajayi
(74) *Attorney, Agent, or Firm* — Patterson & Sheridan, L.L.P.

(57) ABSTRACT

Certain aspects of the present disclosure relate to techniques for transmitting a clear to send (CTS)-to-self indication. According to certain aspects, a method for wireless communications by a wireless device is provided. The method generally includes scheduling a first antenna at the wireless device for communication using one of a first radio access technology (RAT) or a second RAT, scheduling one or more other antennas at the wireless device configured for communication using the first RAT, for communication using the second RAT in order to enable one of transmit or receive diversity on the second RAT or simultaneous communication on the first and second RATs, and transmitting an idle-mode indication to force he first RAT to an idle mode.

60 Claims, 7 Drawing Sheets

(56) References Cited

U.S. PATENT DOCUMENTS

| | | |
|---|---|---|
| 2010/0081394 A1 | 4/2010 | Mashimo |
| 2010/0316027 A1 | 12/2010 | Rick et al. |
| 2012/0207101 A1 | 8/2012 | Chang et al. |
| 2012/0264473 A1 | 10/2012 | Mujtaba et al. |
| 2013/0170478 A1 | 7/2013 | Xhafa et al. |
| 2013/0184030 A1 | 7/2013 | Tavildar et al. |

METHODS AND APPARATUS FOR TRANSMITTING CLEAR TO SEND (CTS)-TO-SELF INDICATION

CLAIM OF PRIORITY UNDER 35 U.S.C. §119

This application claims benefit of U.S. Provisional Patent Application Ser. No. 61/679,414, filed Aug. 3, 2012, which is herein incorporated by reference in its entirety.

BACKGROUND

I. Field

Certain aspects of the present disclosure generally relate to wireless communications and, more specifically, to methods and apparatus for transmitting clear to send (CTS)-to-self indication.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

In an aspect of the present disclosure, a method for wireless communications performed by a wireless device is provided. The method generally includes scheduling a first antenna at the wireless device for communication using one of a first radio access technology (RAT) or a second RAT, scheduling one or more other antennas at the wireless device configured for communication using the first RAT, for communication using the second RAT in order to enable one of transmit or receive diversity on the second RAT or simultaneous communication on the first and second RATs, and transmitting an idle-mode indication to force the first RAT to an idle mode.

In an aspect of the present disclosure, an apparatus for wireless communications is provided. The apparatus generally includes means for scheduling a first antenna at the wireless device for communication using one of a first radio access technology (RAT) or a second RAT, means for scheduling one or more other antennas at the wireless device configured for communication using the first RAT, for communication using the second RAT in order to enable one of transmit or receive diversity on the second RAT or simultaneous communication using the first RAT and the second RAT, and means for transmitting an idle-mode indication to force the first RAT to an idle mode.

In an aspect of the present disclosure, an apparatus for wireless communications is provided. The apparatus generally includes at least one processor configured to schedule a first antenna at the wireless device for communication using one of a first radio access technology (RAT) or a second RAT, schedule one or more other antennas at the wireless device configured for communication using the first RAT, for communication using the second RAT in order to enable one of transmit or receive diversity on the second RAT or simultaneous communication using the first RAT and the second RAT, and transmit an idle-mode indication to force the first RAT to an idle mode. The apparatus generally also includes a memory coupled with the at least one processor.

In an aspect of the present disclosure, a computer-program product for wireless communication is provided. The computer-program product generally includes a computer readable medium having instructions stored thereon, the instructions being executable by one or more processors and the instructions comprising instructions for scheduling a first antenna at the wireless device for communication using one of a first radio access technology (RAT) or a second RAT, instructions for scheduling one or more other antennas at the wireless device configured for communication using the first RAT, for communication using the second RAT in order to enable one of transmit or receive diversity on the second RAT or simultaneous communication using the first RAT and the second RAT, and instructions for transmitting an idle-mode indication to force the first RAT to an idle mode.

Various aspects and features of the disclosure are described in further detail below.

DETAILED DESCRIPTION

Techniques and apparatus are provided herein for transmitting a clear to send (CTS)-to-self indication in order to force an idle state for a radio in a wireless device. For example, a wireless device may have active antennas for long term evolution (LTE) and wireless local area network (WLAN). The wireless device may send a CTS-to-self indication to force the WLAN radio to idle mode, such that the antenna communicating using WLAN may be used for LTE. The CTS-to-self frames may be transmitted during LTE uplink subframes for time division duplexing (TDD) configurations with a duration field in the CTS-to-self frame set to less than the scheduling period of the WLAN. The CTS-to-self frames may also be transmitted on LTE downlink frames where no DL grant is detected. The duration and frequency of the CTS-to-self transmissions may depend on the WLAN traffic load.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Example Wireless Network

Figure 1:
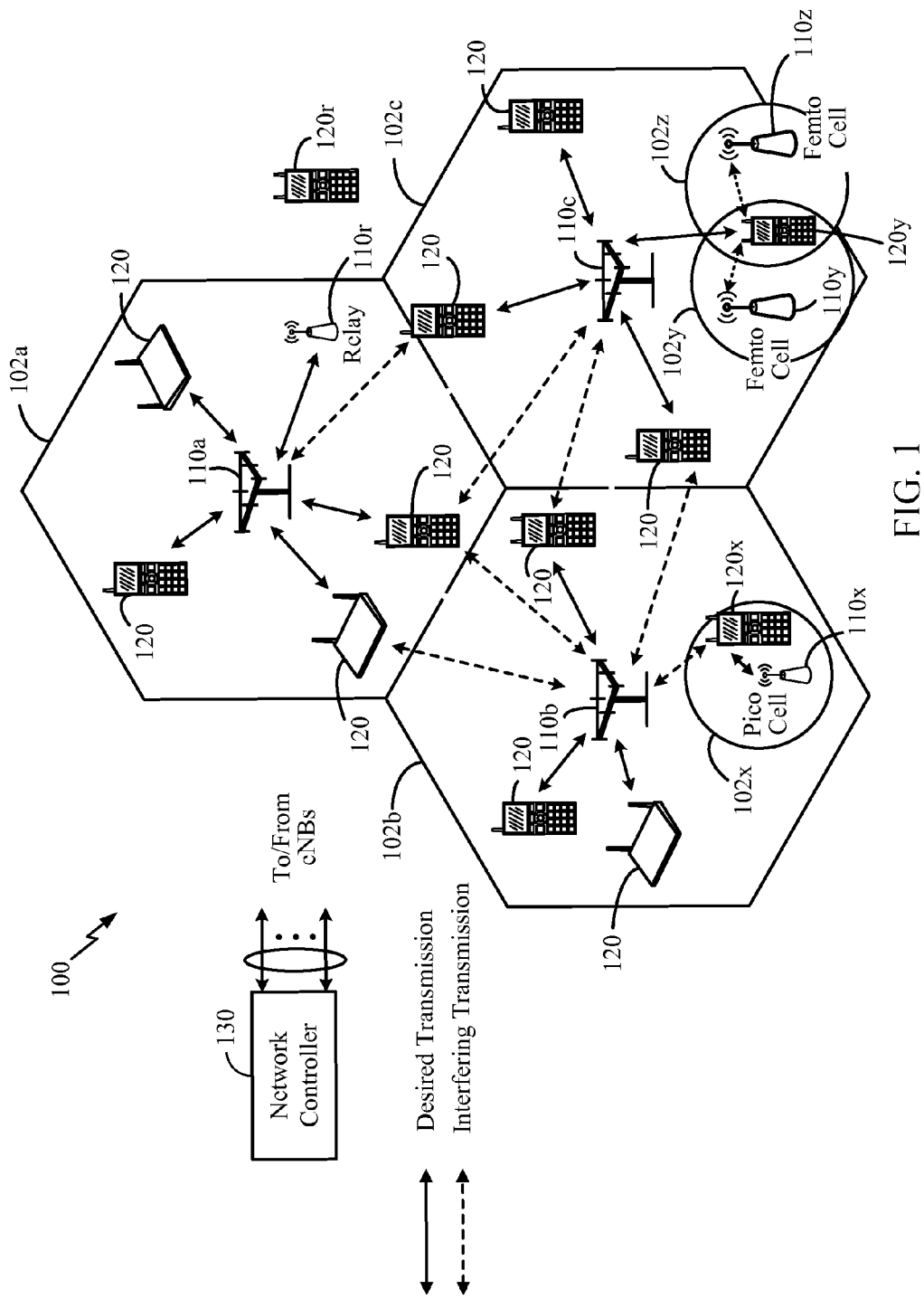
FIG. 1 is a block diagram conceptually illustrating an example of a wireless communications network, in accordance with certain aspects of the present disclosure.

FIG. 1 shows a wireless communication network 100, which may be an LTE network. The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. The term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

Figure 2:
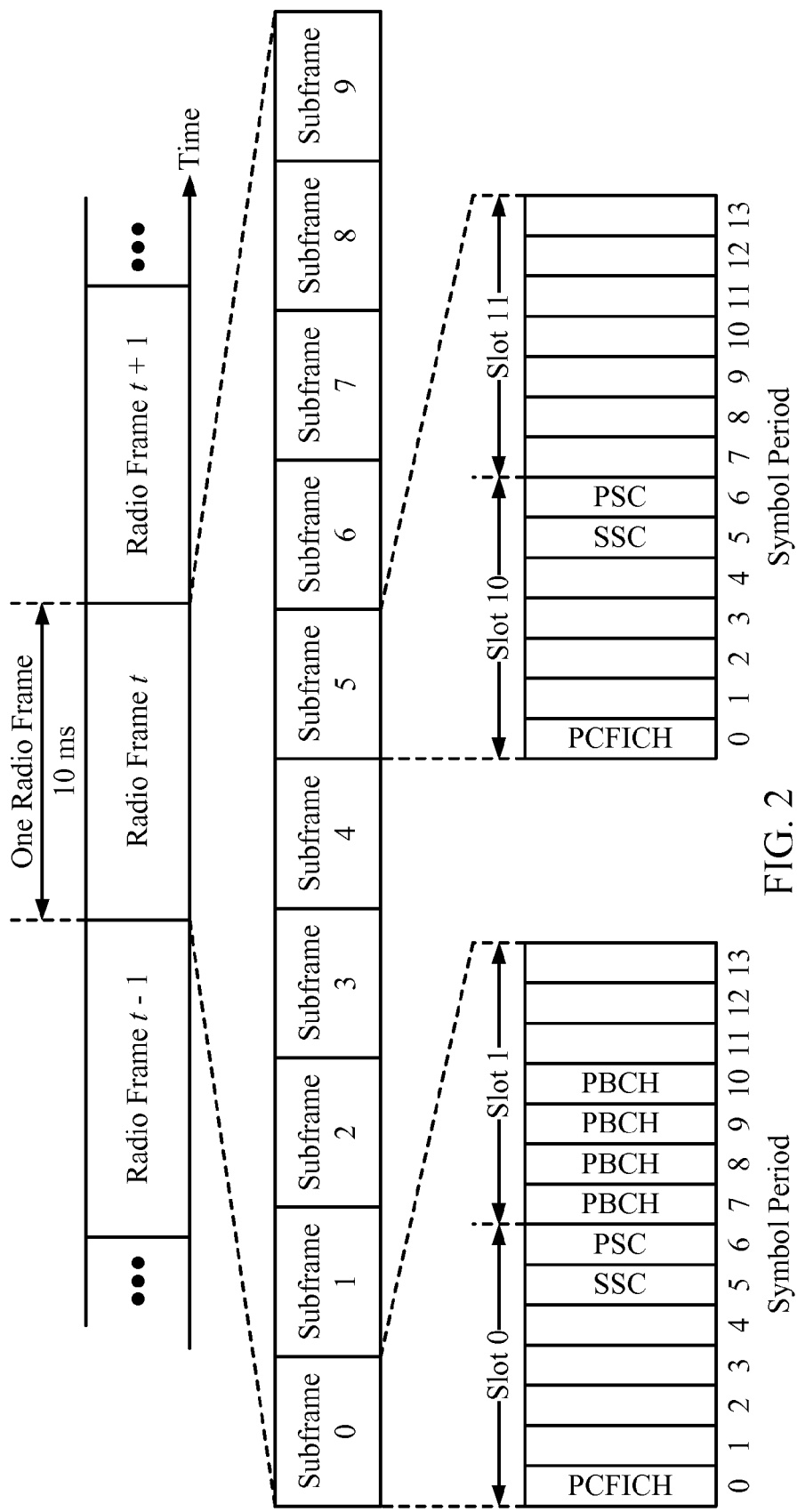
FIG. 2 is a block diagram conceptually illustrating an example of a frame structure in a wireless communications network, in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP), as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
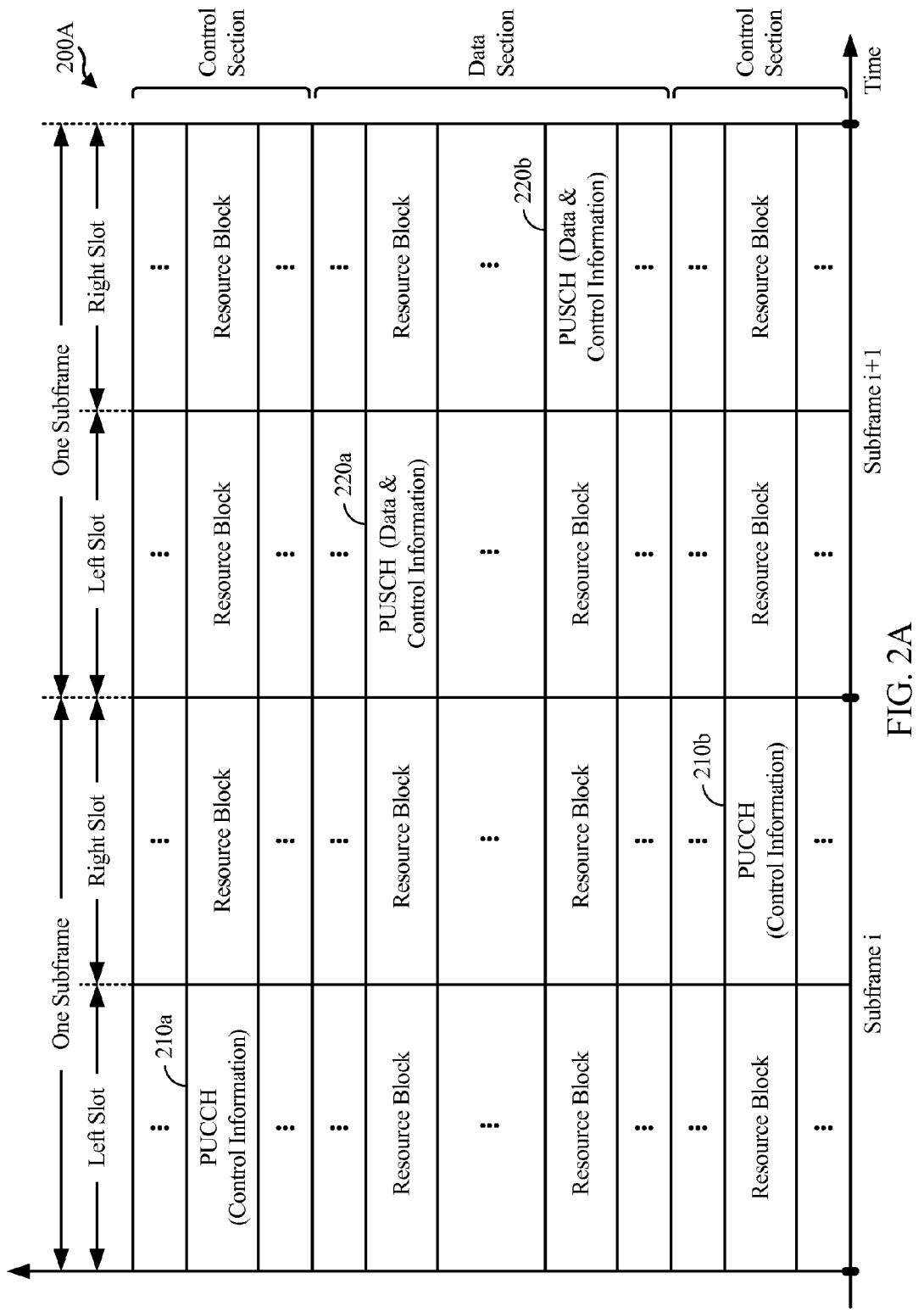
FIG. 2A shows an example format for the uplink in Long Term Evolution (LTE), in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the Node B. The UE may transmit control information in a Physical Uplink Control Channel (PUCCH) 210a, 210b on the assigned resource blocks in the control section. The UE may transmit data or both data and control information in a Physical Uplink Shared Channel (PUSCH) 220a, 220b on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, path loss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower path loss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the path loss for eNB 110x is lower than the path loss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the relative received power of signals from the eNB received at a UE (and not based on the transmit power level of the eNB).

Figure 3:
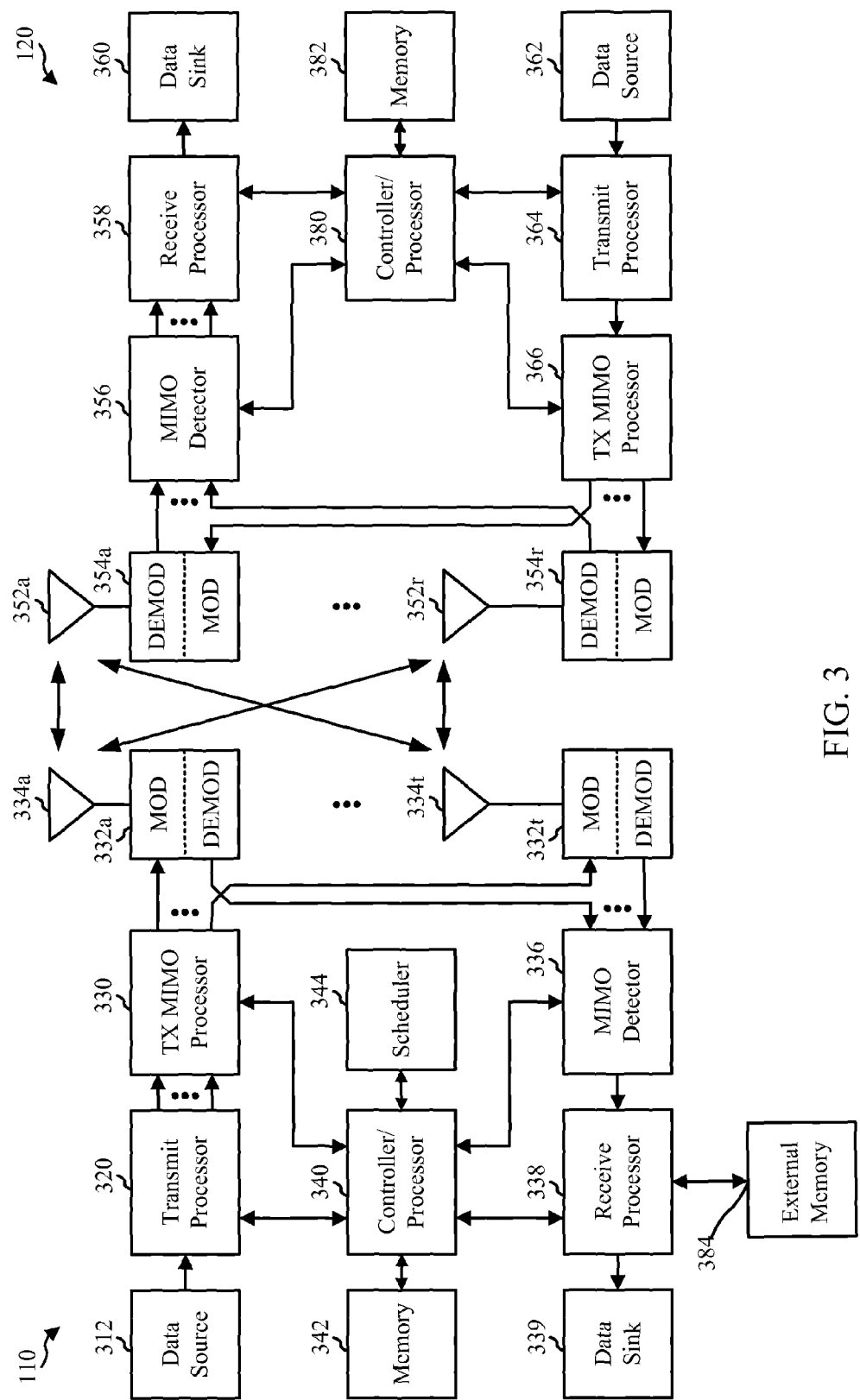
FIG. 3 shows a block diagram conceptually illustrating an example of a Node B in communication with a user equipment device (UE) in a wireless communications network, in accordance with certain aspects of the present disclosure.

FIG. 3 shows a block diagram of a design of a base station or an eNB 110 and a UE 120, which may be one of the base stations/eNBs and one of the UEs in FIG. 1. For a restricted association scenario, the eNB 110 may be macro eNB 110c in FIG. 1, and UE 120 may be UE 120y. The eNB 110 may also be a base station of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by antennas 334, processed by demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340, 380 may direct the operation at the eNB 110 and the UE 120, respectively. The controller/processor 380 and/or other processors and modules at the UE 120 may perform or direct operations for blocks 800 in FIG. 8, operations for blocks 1000 in FIG. 10, operations for blocks 1100 in FIG. 11, and/or other processes for the techniques described herein. The memories 342 and 382 may store data and program codes for base station 110 and UE 120, respectively. A scheduler 344 may schedule UEs for data transmission on the downlink and/or uplink.

Example Methods and Apparatus for Transmitting Clear to Send (CTS)-to-self Indication In devices that support both wide area network (WAN) (e.g., long term evolution (LTE), high speed packet access (HSPA), evolution data optimized (EVDO), etc.) and wireless local area network (WLAN)/Wi-Fi (e.g., 802.11 b/g/n) radio networks, antennas may be re-used by either radio network when the other is idle. The use case considered here is when both radio networks are active in the long term (i.e., both LTE and WLAN are associated with other devices, e Node B (eNB), etc.), but one of the radio networks is forced to idle mode for short intervals. For example, antennas of devices that support both LTE and WLAN networks may be shared between the radio networks. Each antenna of the device may potentially be used for LTE or WLAN. In certain aspects, the antennas of the device may be dynamically assigned to the two radio networks based, for example, on the throughputs of the networks. For example, in an area where WLAN coverage is stronger than LTE coverage, the WLAN throughputs may be higher than the LTE throughputs. In such a scenario, WLAN may be forced to the idle state (e.g., when no Wi-Fi activity is scheduled) for short intervals, and the WLAN antennas may be diverted for use with LTE for improving LTE transmission/reception. This may be done, for example, to substantially equalize LTE and WLAN throughputs or to satisfy certain criteria such as maximizing the minimum of the two throughputs.

In an aspect, when the Wi-Fi link is better than the LTE link, a duty cycle may be imposed or adjusted to equalize Wi-Fi throughput and the backhaul LTE throughput. For example, a set of antennas may be used only for LTE, and another set of antennas may be shared between Wi-Fi and LTE (e.g. 50% duty cycle for Wi-Fi and the rest for LTE).

Figure 4:
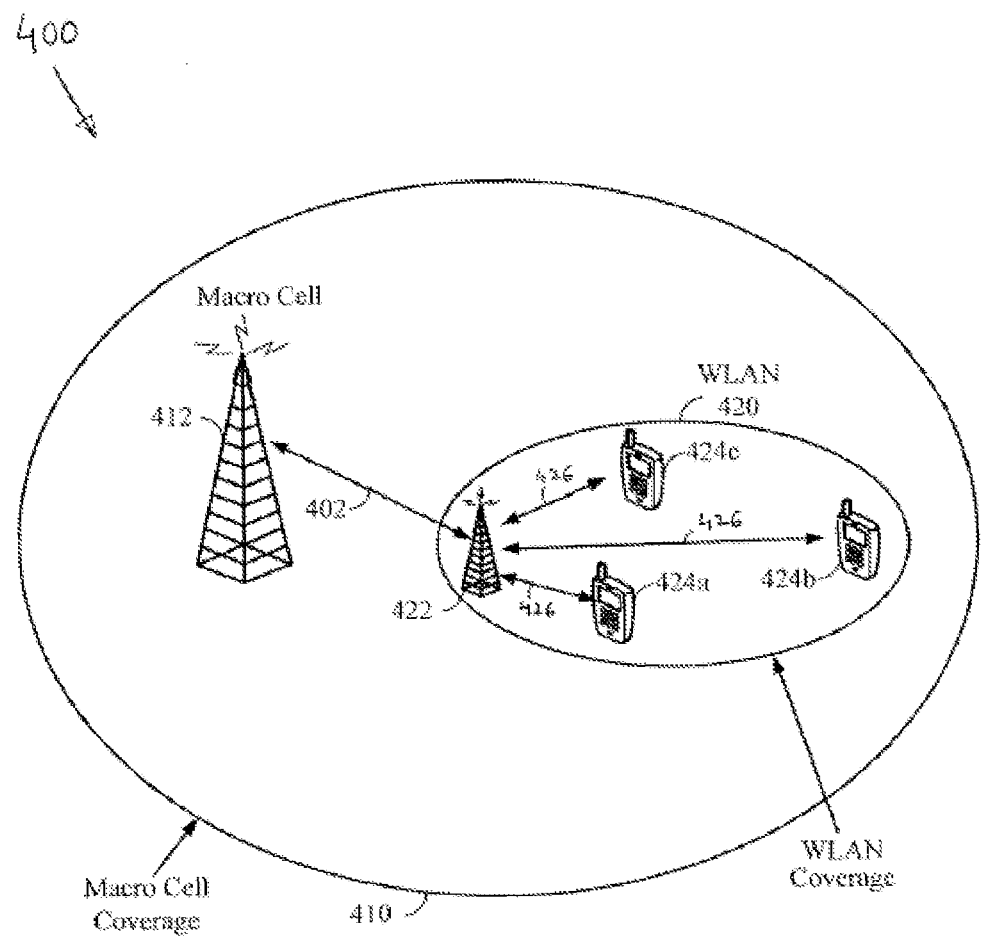
FIG. 4 illustrates an example wireless communication network including LTE and WLAN coverage, in accordance with certain aspects of the present disclosure.

FIG. 4 illustrates an example wireless communication network 400 including LTE and WLAN coverage in accordance with certain aspects of the present disclosure. The wireless communication network 400 includes a macro cell eNB 412 providing WAN coverage 410 to one or more devices. The network 400 may also include a WLAN access point (AP) 422 providing WLAN coverage 420 to devices 424a, b and c. In an aspect, the devices 424 may include a mobile device such as a cell phone, smart phone, laptop, gaming device etc. In an aspect, the devices 424 may include an LTE UE capable of communicating with both the LTE eNB 412 and the WLAN AP 422. In an aspect, the WLAN AP 422 may provide devices 424 with access to one or more services provided by the eNB 412. For example, AP 422 may use LTE network 410 for backhaul and WLAN network 420 for access to devices 424. The AP 422 may communicate with the LTE eNB 412 via a communication link 402 (e.g., a backhaul link) and provide LTE services to devices 424 via WLAN links 426. For example, the AP 422 may be a MiFi wireless router (Wi-Fi hotspot) which may receive broadband internet service from eNB 412 and may make internet connection available to up to five devices 424 connected to the MiFi device. In certain aspects, one or more of the devices 424 may act as a WLAN AP and provide one or more other devices with access to LTE services. In an aspect, the WLAN AP 422 may appear to the LTE eNB 412 as an LTE UE. Thus, the reference numeral 422 may be used interchangeably to refer to WLAN AP and UE (from the eNB 412 perspective), throughout this disclosure.

In certain aspects, each antenna or a set of antennas at the AP 422 may be used for communication using LTE or WLAN. As noted above, the WLAN network 420 may be forced to idle state for certain intervals of time and one or more antennas or sets of antennas being used for WLAN communication may be diverted for use with LTE during these intervals. In an aspect, a first set of antennas at the AP 422 may only be used for LTE communication and a second set of antennas may be switched between WAN and WLAN.

In certain aspects, if the switching between antennas or sets of antennas between WLAN and WAN is frequent, throughput gains due to the additional antennas(s) may not be seen by the eNB 412 if the eNB 412 does not have real-time knowledge of the UE's 422 (from the eNB perspective) number of receive antennas. Generally, each UE periodically reports a channel quality indicator (CQI) indicating a channel quality based on a current set of receive antennas used for LTE communication. The eNB schedules resources (e.g. modulation and coding scheme (MCS)) based on the received CQI reports. However, there is typically a delay involved between the UE reporting the CQI and the reported CQI being available at the eNB for changing rates based on the reported CQI. This delay between the UE reporting CQI and the CQI being available for use at the eNB is typically referred to as the feedback delay. Thus, the eNB 412 may not adapt its transmission rate based on the changed antenna set at the UE 422. For example, the eNB 412 may transmit at rates corresponding to a lower number of receive antennas when additional antennas are available, resulting in poorer throughputs on subframes using these rates.

Alternatively, the eNB 412 may transmit at rates corresponding to a larger number of receive antennas when fewer number of receive antennas are available, resulting in packet failures triggering re-transmissions.

In certain aspects, standard mechanisms do not provide an option for the WLAN AP 422 to switch to the idle state. In certain aspects, clear to send (CTS)-to-self indications may be transmitted by the WLAN AP 422 to force the WLAN to the idle state. The CTS-to-self indication may include CTS-to-self frame(s) or packet(s) that may be transmitted by the AP 422 to capture a channel for a particular time interval so that no device receiving the CTS-to-self indication transmits on the channel at the same time interval. In an aspect, the CTS-to-self indication may include a duration field which specifies the duration for which the AP 422 will capture the channel (i.e., duration of the WLAN idle state). In an aspect, the stations (e.g., devices 424) listening to the channel may read the duration field and set their network allocation vector (NAV), which typically is an indicator for a station on how long it defers from accessing the channel.

In certain aspects, each CTS-to-self indication may have a maximum limitation on the maximum WLAN idle duration (e.g., 32 ms) it may set. That is, the duration field of each CTS-to-self indication may be set only up to the defined maximum duration. If the AP wants the WLAN idle duration to be longer than this maximum idle duration, it must transmit another CTS-to-self indication in the WLAN 420. Thus, in order to impose a long WLAN idle state, the AP 422 may transmit a CTS-to-self indication after every maximum idle duration has expired.

In certain aspects, for each transmission of the CTS-to-self indication, the AP 422 may briefly take back a set of antennas diverted for use with LTE, switch WLAN to an active state, transmit the CTS-to-self indication in the WLAN using those antennas, and then give back the antennas to LTE. This may lead to errors in LTE communication during this interval.

In an aspect, in order to avoid incurring LTE errors due to the WLAN active period on expiration of every maximum idle duration, transmission of the CTS-to-self indication may be done when LTE uplink subframes are scheduled (e.g., if LTE is in time division duplex (TDD) configuration). In an aspect, LTE uplink may use lesser number of antennas as compared to LTE downlink. Thus, for example, if the AP 422 uses two antennas dedicated for LTE only and switches two more antennas between LTE and WLAN, it may transmit during LTE uplink using the dedicated LTE antennas when the LTE uplink is scheduled, and use the other two antennas to transmit the CTS-to-self indication. In an aspect, the duration field set in the CTS-to-self indication may account for the timing of an uplink subframe, by picking a duration less than the maximum allowed idle duration, such that, the next CTS-to-self indication transmitted after this duration lies on a LTE uplink subframe.

In an alternative aspect, the CTS-to-self indication may also be transmitted opportunistically when LTE downlink subframes are scheduled where no downlink grant is detected. The Physical Downlink Control Channel (PDCCH) which is typically transmitted in the first few OFDM symbols (e.g., up to 3 for LTE Bandwidth>1.08 MHz), may be decoded and the CTS-to-self indication may be transmitted if no DL grant is detected, and ideally returning back to LTE before the next LTE subframe starts.

In certain aspects, transmitting the CTS-to-self indication to enable WLAN idle state may incur a network cost. For example, other WLAN devices within range of the WLAN AP 422 may not be allowed to transmit during the idle duration. Thus, frequent and excessive use of the CTS-to-self mechanism may jam neighboring basic service sets (BSSs) operating, for example, on a same channel.

In certain aspects, to handle this issue, the frequency of issuing CTS-to-self frames and their duration (i.e., WLAN idle period) may depend on observed WLAN traffic in the channel. For example, if heavy traffic is observed on the WLAN channel—either on the same BSS or a different BSS—then the WLAN may restrict its idle duration.

To determine whether a channel is busy, the WLAN AP 422 may use various metrics. One approach may be to count the number of OBSSs in range of the AP 422, for example based on received beacons. Another metric may be the fraction of receive time for which clear channel assessment (CCA) is high. The CCA may generally go high if the AP is receiving. The CCA may indicate a fraction of time the AP is not idle (e.g., in receive packet state). In an aspect, a CCA high duration may be ignored due to packets from devices in own BSS, if for example, OBSS traffic on the channel is being measured. In certain aspects, this may lead to lesser LTE performance, but may improve performance for other WLAN devices in the vicinity.

In certain aspects, the CTS-to-self indication may be transmitted at a lower power than normal WLAN packets. For example, if the AP 422 requires that only those WLAN devices in the AP's BSS (i.e., devices associated with the AP 422) do not transmit during the WLAN idle period, the AP may set transmit power of the CTS-to-self indication such that the device with the weakest link associated with the AP 422 may just receive the CTS-to-self frame.

Alternatively, the CTS-to-self indication may be transmitted at normal transmit power but at a higher rate than other management/control frames. The transmit rate may be chosen based on the rates received reliably at the associated devices. For example, if there are two devices associated with AP 422 that may receive MCS 15 and MCS 12 packets respectively, then the AP 422 may transmit CTS-to-self indication with MCS 12. This may ensure that OBSS devices that cannot decode an MCS 12 packet are not affected by the CTS-to-self indication.

In certain aspects, the WLAN AP 422 may transmit beamformed CTS-to-self packets to associated devices (e.g., devices 424). In an aspect, beamforming may be applied to an entire CTS-to-self packet including the preamble. Since beamforming generally improves receive signal power at the associated devices, this may allow the AP to further reduce transmit power or increase its transmit MCS (rate). Compared to non-beamformed transmission, only OBSS devices along the "precoded direction" may be affected by the CTS-to-self packets. This may be generalized to transmitting multiple consecutive CTS-to-self packets—each beamformed to one (or more) associated device(s).

Figure 5:
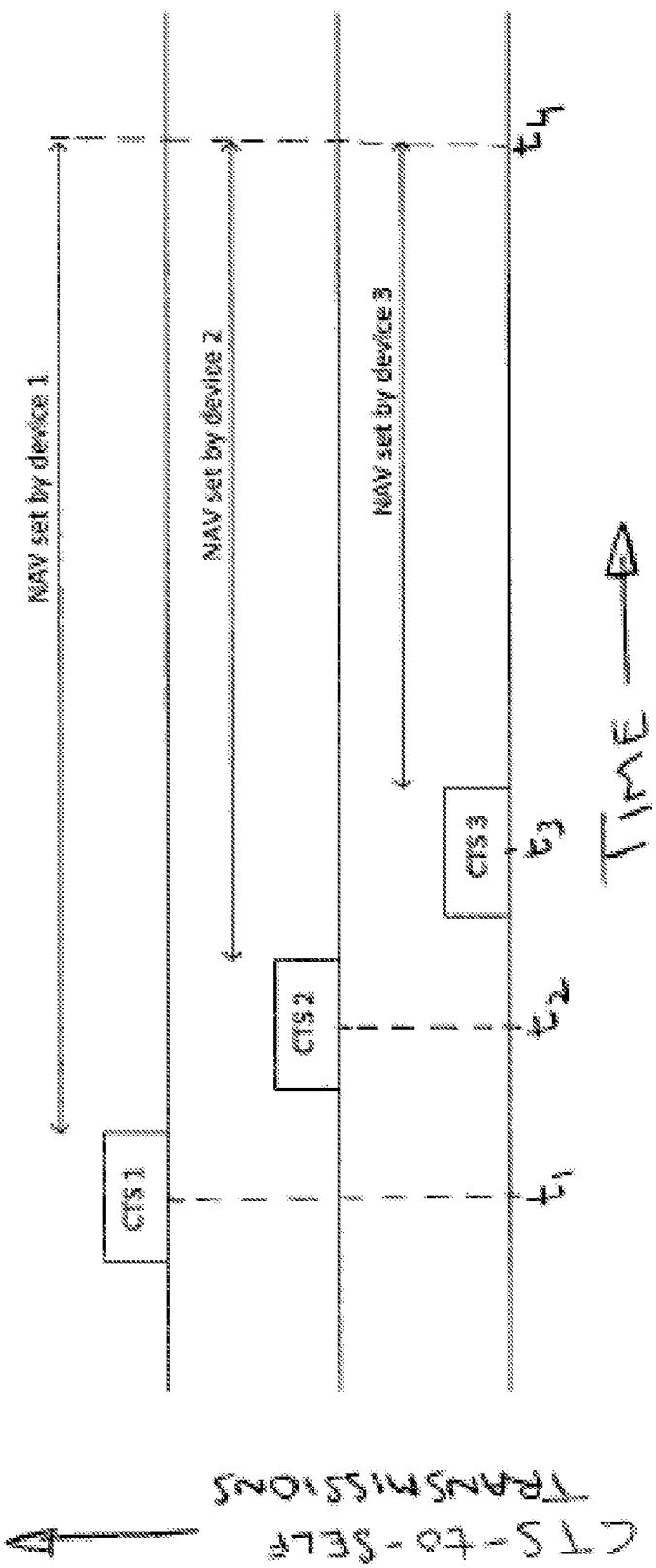
FIG. 5 illustrates transmission of beamformed CTS-to-self indication with the duration of each CTS-to-self indication taking into account a transmission time of an earlier CTS-to-self indication, in accordance with certain aspects of the present disclosure.

In an aspect, the duration field in each transmitted CTS-to-self frame may take into account the transmission time of an earlier CTS-to-self packet. For example, FIG. 5 illustrates transmission of beamformed CTS-to-self indication with the duration of each CTS-to-self indication taking into account a transmission time of an earlier CTS-to-self indication, in accordance with certain aspects of the present disclosure. Beamformed CTS-to-self indication CTS 1 is transmitted to device 1 at time t1, followed by beamformed CTS 2 to device 2 at t2 and then beamformed CTS 3 device 3 at t3. As indicated by the NAV set by each of the devices 1-3, the idle time for all three CTS transmissions expires at the same time t4. This may be achieved by setting the duration fields of each of CTS 2 and CTS 3 based on the transmission of a previous CTS transmission. For example, CTS 2 duration field may be set based on the transmission CTS1, and CTS 3 duration field may be set based on the transmission time of CTS 2.

Figure 6:
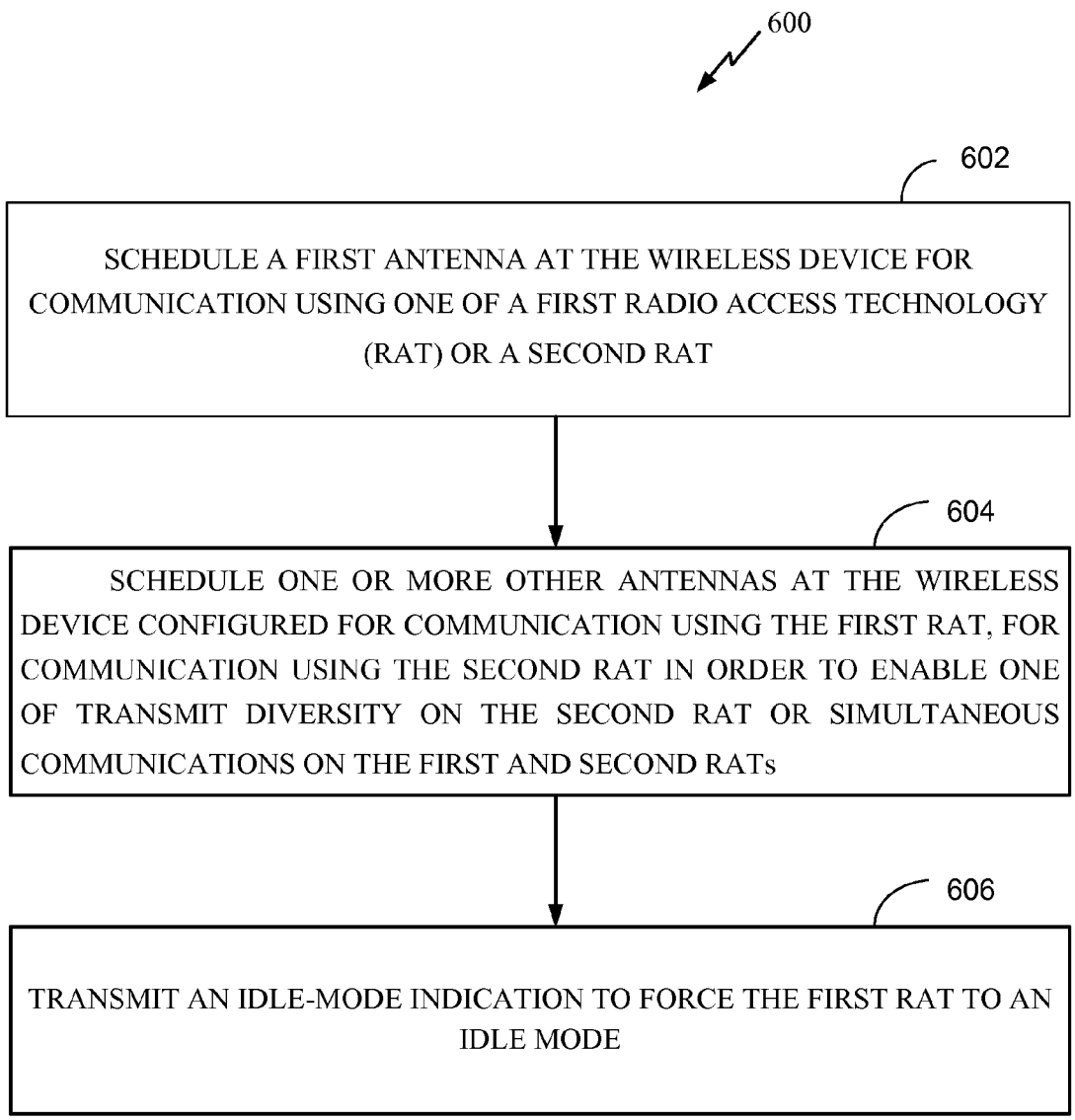
FIG. 6 is a flow diagram illustrating operations by a wireless device for transmitting idle-mode indication, in accordance with certain aspects of the present disclosure.

FIG. 6 is a flow diagram illustrating operations 600 for wireless communications by a wireless device, in accordance with certain aspects of the present disclosure. The wireless device may be, for example, an AP. Operations 600 may begin, at 602, by scheduling a first antenna at the wireless device for communication using one of a first radio access technology (RAT) or a second RAT. According to certain aspects, the first RAT may be a WLAN network and the second RAT may be an LTE network. The wireless device may be a WLAN AP. The wireless device may be in a BSS.

At 604, the wireless device may schedule one or more other antennas at the wireless device configured for communication using the first RAT, for communication using the second RAT in order to enable one of transmit or receive diversity on the second RAT or simultaneous communication on the first and second RATs. The other antennas may be used for periodically beacon scanning in the first RAT.

At 606, the wireless device may transmit an idle-mode indication to force the first RAT to an idle mode. According to certain aspects the idle-mode indication may be a power-save indication or CTS-to-self indication. The idle-mode indication may specific a duration for which the first RAT must maintain the idle mode. The duration of the idle mode may be set such that a transmission of a subsequent idle-mode indication lies within a scheduling period of an LTE uplink subframe or opportunistically transmitted on an LTE downlink subframe with no scheduled downlink grant. The frequency of transmitting the idle-mode indication or duration of the idle mode may also be based on a volume of traffic on a channel using the first RAT (e.g., as determined by a number of BSSs using the channel or when CCA is high). The idle-mode indication may be transmitted at just enough power such that a weakest link device associated with the wireless device is able to receive the indication. Alternatively, the idle-mode indication may be transmitted at a rate higher than a rate at which control signaling for the first RAT is transmitted. The idle-mode indication may be transmitted as a beamformed transmission.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications by a wireless device, comprising:
    scheduling a first antenna at the wireless device for communication using one of a first radio access technology (RAT) or a second RAT;
    scheduling one or more other antennas at the wireless device configured for communication using the first RAT, for communication using the second RAT in order to enable one of transmit or receive diversity on the second RAT or simultaneous communication using the first RAT and the second RAT; and
    transmitting an idle-mode indication to force the first RAT to an idle mode, wherein the idle-mode indication comprises a duration for which the first RAT must maintain the idle mode, and wherein the duration of the idle mode is set such that a transmission of a subsequent idle-mode indication lies within a scheduling period of an uplink subframe or a downlink subframe with no scheduled downlink grant.

2. The method of claim 1, wherein the idle-mode indication comprises a power-save indication.

3. The method of claim 1, wherein the one or more other antennas are periodically used for beacon scanning in the first RAT.

4. The method of claim 1, wherein the first RAT comprises a wireless local area network (WLAN) and the second RAT comprises long term evolution (LTE), and wherein the wireless device comprises a WLAN access point (AP).

5. The method of claim wherein the wireless vice comprises a device in a basic service set (BSS).

6. The method of claim 1, wherein the idle-mode indication is transmitted within a scheduling period of a long term evolution (LTE) uplink subframe.

7. The method of claim 1, wherein the idle-mode indication is transmitted within a scheduling period of a long term evolution (LTE) downlink subframe with no scheduled downlink grant.

8. The method of claim 1, wherein at least one of a frequency of transmitting the idle-mode indication or the duration of the idle mode is set based on a volume of traffic on a channel using the first RAT.

9. The method of claim 8, wherein the volume of traffic on the channel is determined by a number of basic service sets (BSSs) using the channel.

10. The method of claim 8, wherein the volume of traffic on the channel is determined by a time for which a clear channel assessment (CCA) is high.

11. The method of claim 1, wherein the idle-mode indication is transmitted at a power level equal to a minimum power level that a device with a weakest link associated with the wireless device receives the idle-mode indication.

12. The method of claim 1, wherein the idle-mode indication is transmitted at a first rate higher than a second rate at which control signaling for the first RAT is transmitted.

13. The method of claim 1, wherein the transmission of the idle-mode indication comprises a beamformed transmission of the idle-mode indication to at least one device associated with the wireless device.

14. An apparatus for wireless communications, comprising:
    means for scheduling a first antenna at the wireless device for communication using one of a first radio access technology (RAT) or a second RAT;
    means for scheduling one or more other antennas at the wireless device configured for communication using the first RAT, for communication using the second RAT in order to enable one of transmit or receive diversity on the second RAT or simultaneous communication using the first RAT and the second RAT; and
    means for transmitting an idle-mode indication to force the first RAT to an idle mode, wherein the idle-mode indication comprises a duration for which the first RAT must maintain the idle mode, and wherein the duration of the idle mode is set such that a transmission of a subsequent idle-mode indication lies within a scheduling period of an uplink subframe or a downlink subframe with no scheduled downlink grant.

15. The apparatus of claim 14, wherein the idle-mode indication comprises a power-save indication.

16. The apparatus of claim 14, wherein the one or more other antennas are periodically used for beacon scanning in the first RAT.

17. The apparatus of claim 14, wherein the first RAT comprises a wireless local area network (WLAN) and the second RAT comprises long term evolution (LTE), and wherein the wireless device comprises a WLAN access point (AP).

18. The apparatus of claim 14, wherein the wireless device comprises a device in a basic service set (BSS).

19. The apparatus of claim 14, wherein the idle-mode indication is transmitted within a scheduling period of a long term evolution (LTE) uplink subframe.

20. The apparatus of claim 14, wherein the idle-mode indication is transmitted within a scheduling period of a long term evolution (LTE) downlink subframe with no scheduled downlink grant.

21. The apparatus of claim 14, wherein at least one of a frequency of transmitting the idle-mode indication or the duration of the idle mode is set based on a volume of traffic on a channel using the first RAT.

22. The apparatus of claim 21, wherein the volume of traffic on the channel is determined by a number of basic service sets (BSSs) using the channel.

23. The apparatus of claim 21, wherein the volume of traffic on the channel is determined by a time for which a clear channel assessment (CCA) is high.

24. The apparatus of claim 14, wherein the idle-mode indication is transmitted at a power level equal to a minimum power level that a device with a weakest link associated with the wireless device receives the idle-mode indication.

25. The apparatus of claim 14, wherein the idle-mode indication is transmitted at a first rate higher than a second rate at which control signaling for the first RAT is transmitted.

26. The apparatus of claim 14, wherein the transmission of the idle-mode indication comprises a beamformed transmission of the idle-mode indication to at least one device associated with the wireless device.

27. An apparatus for wireless communications, comprising:
at least one processor configured to:
schedule a first antenna at the wireless device for communication using one of a first radio access technology (RAT) or a second RAT;
schedule one or more other antennas at the wireless device configured for communication using the first RAT, for communication using the second RAT in order to enable one of transmit or receive diversity on the second RAT or simultaneous communication using the first RAT and the second RAT; and
transmit an idle-mode indication to force the first RAT to an idle mode, wherein the die-mode indication comprises a duration for which the first RAT must maintain the idle mode, and wherein the duration of the idle mode is set such that a transmission of a subsequent idle-mode indication lies within a scheduling period of an uplink subframe or a downlink subframe with no scheduled downlink grant; and
a memory coupled with the at least one processor.

28. The apparatus of claim 27, wherein the idle-mode indication comprises a power-save indication.

29. The apparatus of claim 27, wherein the one or more other antennas are periodically used for beacon scanning in the first RAT.

30. The apparatus of claim 27, wherein the first RAT comprises a wireless local area network (WLAN) and the second RAT comprises long term evolution (LTE), and wherein the wireless device comprises a WLAN access point (AP).

31. The apparatus of claim 27, wherein the wireless device comprises a device its a basic service set (BSS).

32. The apparatus of claim 27, wherein the idle-mode indication is transmitted within a scheduling period of a long term evolution (IYE) uplink subfraine.

33. The apparatus of claim 27, wherein the idle-mode indication is transmitted within a scheduling period of a long term evolution (LTE) downlink subframe with no scheduled downlink grant.

34. The apparatus of claim 27, wherein at least one of a frequency of transmitting the idle-mode indication or the duration of the idle mode is set based on a volume of traffic on a channel using the first RAT.

35. The apparatus of claim 34, wherein the volume of traffic on the channel is determined by a number of basic service sets (BSSs) using the channel.

36. The apparatus of claim 34, wherein the volume of traffic on the channel is determined by a time for which a clear channel assessment (CCA) is high.

37. The apparatus of claim 27, wherein the idle-mode indication is transmitted at a power level equal to a minimum power level that a device with a weakest link associated with the wireless device receives the idle-mode indication.

38. The apparatus of claim 27, wherein the idle-mode indication is transmitted at a first rate higher than a second rate at which control signaling for the first RAT is transmitted.

39. The apparatus of claim 27, wherein the transmission of the idle-mode indication comprises a beamformed transmission of the idle-mode indication to at least one device associated with the wireless device.

40. A computer-program product for wireless communication, comprising a non-transitory computer readable medium having instructions stored thereon, the instructions being executable by one or more processors and the instructions comprising:
instructions for scheduling a first antenna at the wireless device for communication using one of a first radio access technology (RAT) or a second RAT;
instructions for scheduling one or more other antennas at the wireless device configured for communication using the first RAT, for communication using the second RAT in order to enable one of transmit or receive_diversity on the second RAT or simultaneous communication using the first RAT and the second RAT; and
instructions for transmitting an idle-mode indication to force the first RAT to an idle mode, wherein the idle-mode indication comprises a duration for which the first RAT must maintain the idle mode, and wherein the duration of the idle mode is set such that a transmission of a subsequent idle-mode indication lies within a scheduling period of an uplink subframe or a downlink subframe with no scheduled downlink grant.

41. The computer-program product of claim 40, wherein the idle-mode indication comprises a power-save indication.

42. The computer-program product of claim 40, wherein the one or more other antennas are periodically used for beacon scanning in the first RAT.

43. The computer-program product of claim 40, wherein the first RAT comprises a wireless local area network (WLAN) and the second RAT comprises long term evolution (LTE), and wherein the wireless device comprises a WLAN access point (AP).

44. The computer-program product of claim 40, wherein the wireless device comprises a device in a basic service set (BSS).

45. The computer-program product of claim 40, wherein the idle-mode indication is transmitted within a scheduling period of a long term evolution (LTE) uplink subframe.

46. The computer-program product of claim 40, wherein the idle-mode indication is transmitted within a scheduling period of a long term evolution (LTE) downlink subframe with no scheduled downlink grant.

47. The computer-program product of claim 40, wherein at least one of a frequency of transmitting the idle-mode indication or the duration of the idle mode is set based on a volume of traffic on a channel using the first RAT.

48. The computer-program product of claim 47, wherein the volume of traffic on the channel is determined by a number of basic service sets (BSSs) using the channel.

49. The computer-program product of claim 47, wherein the volume of traffic on the channel is determined by a time for which a clear channel assessment (CCA) is high.

50. The computer-program product of claim 40, wherein the idle-mode indication is transmitted at a power level equal to a minimum power level that a device with a weakest link associated with the wireless device receives the idle-mode indication.

51. The computer-program product of claim 40, wherein the idle-mode indication is transmitted at a first rate higher than a second rate at which control signaling for the first RAT is transmitted.

52. The computer-program product of claim 40, wherein the transmission of the idle-mode indication comprises a beamformed transmission of the idle-mode indication to at least one device associated with the wireless device.

53. The method of claim 8, wherein the volume of traffic on the channel is determined by a time for which a clear channel assessment (CCA) due to packets received from devices in overlapping basic service sets (OBSSs) is high.

54. The method of claim 12, wherein the first rate is determined based on a minimum rate that a device with a weakest link associated with the wireless device receives the idle-mode indication.

55. The apparatus of claim 21, wherein the volume of traffic on the channel is determined by a time for which a clear channel assessment (CCA) due to packets received from devices in overlapping basic service sets (OBSSs) is high.

56. The apparatus of claim 25, wherein the first rate is determined based on a minimum rate that a device with a weakest link associated with the wireless device receives the idle-mode indication.

57. The apparatus of claim 34, wherein the volume of traffic on the channel is determined by a time for which a clear channel assessment (CCA) due to packets received from devices in overlapping basic service sets (OBSSs) is high.

58. The apparatus of claim 38, wherein the first rate is determined based on a minimum rate that a device with a weakest link associated with the wireless device receives the idle-mode indication.

59. The computer-program product of claim 47, wherein the volume of traffic on the channel is determined by a time for which a clear channel assessment (CCA) due to packets received from devices in overlapping basic service sets (OBSSs) is high.

60. The computer-program product of claim 51, wherein the first rate is determined based on a minimum rate that a device with a weakest link associated with the wireless device receives the idle-mode indication.

\* \* \* \* \*